United States Patent
Schmaunz-Hirsch et al.

(10) Patent No.: US 12,528,961 B2
(45) Date of Patent: *Jan. 20, 2026

(54) AQUEOUS DIPPING COMPOSITION

(71) Applicants: Continental Reifen Deutschland GmbH, Hannover (DE); Kordsa Teknik Tekstil A.S., Kocaeli (TR)

(72) Inventors: Cornelia Schmaunz-Hirsch, Hannover (DE); Thomas Kramer, Hannover (DE); Diana Pinto, Hannover (DE); Michael Schunack, Hannover (DE); Ali Ersin Acar, Istanbul (TR); Mustafa Yasin Sen, Kocaeli (TR); Nurcin Cevahir, Kocaeli (TR); Yucel Ayyildiz, Kocaeli (TR)

(73) Assignees: CONTINENTAL REIFEN DEUTSCHLAND GMBH, Hannover (DE); KORDSA TEKNIK TEKSTIL A.S., Kocaeli (TR)

( * ) Notice: Subject to any disclaimer, the term of this patent is extended or adjusted under 35 U.S.C. 154(b) by 466 days.

This patent is subject to a terminal disclaimer.

(21) Appl. No.: 17/435,346

(22) PCT Filed: Feb. 28, 2020

(86) PCT No.: PCT/EP2020/055329
§ 371 (c)(1),
(2) Date: Aug. 31, 2021

(87) PCT Pub. No.: WO2020/178191
PCT Pub. Date: Sep. 10, 2020

(65) Prior Publication Data
US 2022/0135825 A1    May 5, 2022

(30) Foreign Application Priority Data

Mar. 1, 2019   (EP) .................................... 19160364

(51) Int. Cl.
| | | |
|---|---|---|
| *C09D 109/08* | (2006.01) |
| *B60C 1/00* | (2006.01) |
| *C09D 5/02* | (2006.01) |
| *C09D 7/61* | (2018.01) |
| *D06M 11/38* | (2006.01) |
| *D06M 11/47* | (2006.01) |
| *D06M 13/02* | (2006.01) |
| *D06M 13/11* | (2006.01) |
| *D06M 13/395* | (2006.01) |
| *D06M 15/263* | (2006.01) |
| *D06M 15/693* | (2006.01) |

(52) U.S. Cl.
CPC ........... *C09D 109/08* (2013.01); *C09D 5/022* (2013.01); *C09D 7/61* (2018.01); *D06M 11/38* (2013.01); *D06M 11/47* (2013.01); *D06M 13/02* (2013.01); *D06M 13/11* (2013.01); *D06M 13/395* (2013.01); *D06M 15/263* (2013.01); *D06M 15/693* (2013.01); *B60C 1/00* (2013.01)

(58) Field of Classification Search
None
See application file for complete search history.

(56) References Cited

U.S. PATENT DOCUMENTS

| | | | |
|---|---|---|---|
| 3,330,689 A * | 7/1967 | Ells ..................... D06M 15/693 |
| | | | 442/127 |
| 3,973,071 A | 8/1976 | Fahey | |
| 4,137,358 A | 1/1979 | Hartz | |
| 9,394,647 B2 * | 7/2016 | Ikeda ........................ C08J 5/06 |
| 2017/0130396 A1 | 5/2017 | Cevahir et al. | |
| 2017/0137675 A1 | 5/2017 | Kiesewetter | |

FOREIGN PATENT DOCUMENTS

| | | | |
|---|---|---|---|
| CN | 106084362 | * | 11/2016 |
| CN | 106084362 A | | 11/2016 |
| EP | 0 223 000 A2 | | 5/1987 |
| EP | 2955268 | * | 12/2015 |
| EP | 3 323 936 A1 | | 5/2018 |
| EP | 3323936 | * | 5/2018 |
| JP | S50-003184 A | | 1/1975 |
| JP | S51-041003 A | | 4/1976 |
| JP | S54-069192 A | | 6/1979 |
| LU | 93348 B1 | | 6/2017 |

(Continued)

OTHER PUBLICATIONS

Machine Translation of CN106084362 (Year: 2016).*
Extended European Search Report issued in European Patent Application No. EP 19 16 0364 on Sep. 9, 2019.
International Search Report & Written Opinion of the International Searching Authority issued in PCT Application No. PCT/EP2020/055329 on Aug. 10, 2020.
1st Examination Report issued in Indian Application No. 202117039655, dated Jan. 16, 2023.
1st Notification of Reasons for Refusal issued in Japanese Application No. 2021-551889, dated May 30, 2023.
1st Office Action issued in Brazilian Application No. 112021017012-0, dated Sep. 21, 2023.
1st Office Action with Search Report issued in Chinese Application No. 202080018190.3, dated Feb. 8, 2023.

(Continued)

*Primary Examiner* — Shawn McKinnon
(74) *Attorney, Agent, or Firm* — Foley & Lardner LLP

(57) ABSTRACT

The present invention relates to an aqueous dipping composition for coating a textile reinforcing material, comprising 4% to 50% by dry weight of at least one rubber latex, 0.1% to 10% by dry weight of at least one blocked isocyanate, 0.3% to 30% by dry weight of at least one wax, 0% to 6% by dry weight of at least one epoxy group-containing compound, and 0% to 15% by dry weight of at least one polymer with carboxylic acid functional groups, wherein the amounts in % by dry weight are based on the total weight of the aqueous dipping composition. The present invention relates to a use of such a composition, a process for coating a textile reinforcing material with this composition, a coated textile reinforcing material and a respective elastomeric article comprising the same.

22 Claims, No Drawings

(56) References Cited

FOREIGN PATENT DOCUMENTS

| | | |
|---|---|---|
| WO | WO-2010/125992 A1 | 11/2010 |
| WO | WO-2015/188939 A1 | 12/2015 |
| WO | WO-2018/182229 A1 | 10/2018 |

OTHER PUBLICATIONS

2nd Notification of Reasons for Refusal issued in Japanese Application No. 2021-551889, dated Sep. 13, 2023.
2nd Office Action with Search Report issued in Chinese Application No. 202080018190.3, dated Oct. 31, 2023.
3rd Notification of Reasons for Refusal issued in Japanese Application No. 2021-551889, dated Jan. 4, 2024.
3rd Office Action issued in Chinese Application No. 202080018190.3, dated Mar. 20, 2024.
Office Action issued in a Korean Application No. 10-2021-7031680, dated Mar. 24, 2025.

* cited by examiner

AQUEOUS DIPPING COMPOSITION

CROSS REFERENCE TO RELATED APPLICATIONS

This is a National Stage Application of PCT Application No. PCT/EP2020/055329, filed on Feb. 28, 2020, which claims priority to European Patent Application No. 19160364.6 filed on Mar. 1, 2019.

The present invention relates to an aqueous dipping composition for coating a textile reinforcing material, comprising 4% to 50% by dry weight of at least one rubber latex, 0.1% to 10% by dry weight of at least one blocked isocyanate, 0.3% to 30% by dry weight of at least one wax, 0% to 6% by dry weight of at least one epoxy group-containing compound, and 0% to 15% by dry weight of at least one polymer with carboxylic acid functional groups, wherein the amounts in % by dry weight are based on the total weight of the aqueous dipping composition, wherein the weight ratio of rubber latex to the sum of blocked isocyanate, epoxy group-containing compound and polymer with carboxylic acid functional groups is at least 2, and wherein the composition is essentially free of resorcinol, resorcinol precondensates, formaldehyde and formaldehyde-releasing substances. The present invention further relates to the use of such a composition, to a process for coating a textile reinforcing material with this composition, to a coated textile reinforcing material and a respective elastomeric article comprising the coated textile reinforcing material.

It is known that various components of motor vehicle tyres include textile strengthening members (hereinafter also referred to as textile reinforcing material) for reinforcement. These textile strengthening members are generally based on multifilament textile cords or flat constructions like tapes also based on multifilament yarns. Other industrial elastomeric articles such as belts and hoses can also include such strengthening members. In tyres or other industrial elastomeric articles, the strengthening members are typically provided together with an elastomeric compound or rubber mixture. One problem is that the strengthening member and the elastomeric compound normally have different strengths. Especially under ongoing mechanical and dynamic stress, as in driving operation of a motor vehicle tyre, adequate bonding between the strengthening member and the surrounding elastomeric compound is therefore necessary.

The activation of the strengthening members prior to rubberization for adequate bonding (activation of bonding) is known from the prior art. This is typically achieved by treating the strengthening member with a dipping composition which facilitates the subsequent bonding between the strengthening member and the elastomeric compound. Such a dipping composition has to fulfil various requirements. Most importantly, the dipping composition has to provide the activation of the strengthening member so as to enable a good bonding between the strengthening member and the elastomeric compound. The strengthening members treated with the dipping composition should also provide good storage stability (hereinafter also referred to as shelf life stability) so that it is not necessary to immediately further process the treated strengthening members. Finally, the dipping composition should be easy to handle and well processable.

Traditionally, RFL (resorcinol-formaldehyde latex) containing dipping compositions have been used for this purpose, and the strengthening member has been treated with such a composition prior to the bonding to the elastomeric compound. In addition, blocked isocyanate and/or epoxy compounds are known for use in combination with RFL dips in order to pre-activate or further activate the strengthening members. WO 2005/026239 A1 discloses, for example, the use of polyisocyanates and RFL.

However, resorcinol and formaldehydes are classified as being harmful to the environment and health, and so efforts have been made to provide alternatives thereto. RF-free dipping compositions have been suggested as described, for example, in WO 2015/188939 A1, WO 2014/175844 A2 and WO 2014/091376 A1. These compositions are based on an acrylic polymer resin, an epoxy resin, a blocked polyisocyanate and a styrene-butadiene (SBR) latex and/or a vinylpyridine (VP) latex, and cords treated with these compositions show a good bonding to rubberizing mixtures. However, these patent applications are silent with respect to the storage stability of the textile reinforcing material treated with the described compositions. Another RF-free dipping composition is described in CN 106084362. This composition consists of a blocked isocyanate, an epoxy compound, a rubber latex, a rubber modifier and water. However, the proposed weight ratios for the various components are not entirely clear from this patent application. Moreover, also this patent application is silent with respect to the storage stability of the textile reinforcing material treated with the described compositions.

In view of the above, an object of the present invention is to provide a RF-free dipping composition for coating a textile reinforcing material which provides a still further improved bonding between a strengthening member and an elastomeric compound, and which at the same time is easy to handle and allows the treated textile reinforcing materials to be stored over a long period of time.

This technical problem is solved by the embodiments characterized in the claims.

In particular, the present invention provides an aqueous dipping composition for coating a textile reinforcing material, comprising 4% to 50% by weight (dry weight) of at least one rubber latex, 0.1% to 10% by weight (dry weight) of at least one blocked isocyanate, 0.3% to 30% by weight (dry weight) of at least one wax, 0% to 6% by weight (dry weight) of at least one epoxy group-containing compound, and 0% to 15% by weight (dry weight) of at least one polymer with carboxylic acid functional groups, wherein the amounts in % by weight are based on the total weight of the aqueous dipping composition, wherein the weight ratio of rubber latex to the sum of blocked isocyanate, epoxy group-containing compound and polymer with carboxylic acid functional groups is at least 2, and wherein the composition is essentially free of resorcinol, resorcinol precondensates, formaldehyde and formaldehyde-releasing substances.

It is noted that the expression "% by weight (dry weight)" as used in the present specification corresponds to and has the same meaning as "% by dry weight". This terminology is used to clarify that the dry weight of each component (and not the weight of an aqueous dispersion of the component, for example) is meant. When it is stated within the present specification that the amounts in % by weight are based on the total weight of the aqueous dipping composition, it is again meant that the amounts in % by dry weight are based on the total weight of the aqueous dipping composition. The present invention provides a RF-free aqueous dipping composition which can be used for coating a textile reinforcing material. The specific combination of components of the claimed aqueous dipping composition enables a multitude of chemical reactions by which the textile reinforcing material undergoes activation which leads to a further improved bonding between the textile reinforcing material and an elastomeric compound as compared to the dipping compositions of the prior art. In addition, it has surprisingly been found that the storage stability of a textile reinforcing material treated with the claimed composition is improved as compared to the RF-free dipping compositions of the prior art. Moreover, the aqueous dipping composition according to the present invention is easy to handle and can be used for a broad variety of textile reinforcing materials.

According to the present invention, the rubber latex can be any suitable rubber latex. For example, the at least one rubber latex can be selected from natural rubber latex (NR), styrene-butadiene rubber latex (SBR), ethylene-propylene-diene rubber latex (EPDM), butyl rubber latex (IIR), styrene-butadiene-vinylpyridine rubber latex (VP), nitrile butadiene rubber latex (NBR), chloroprene rubber latex (CR), isoprene rubber latex (IR), butadiene rubber latex (BR), ethylene-vinyl acetate rubber latex (EVM), hydrogenated nitrile-butadiene rubber latex (HNBR), polyacrylate rubber latex (ACM), chloropolyethylene rubber latex (CM), chlorosulfunated polyethylene rubber latex (CSM), ethylene-propylene rubber latex (EPM), fluoro rubber latex (FKM), epichlorhydrin rubber latex (CO), epichlorhydrin copolymer rubber latex (ECO), propylene oxide copolymer rubber latex (GPO), bromobutyl rubber latex (BIIR), chlorobutyl rubber latex (CIIR), silicone rubber latex, functionalized rubber latex or combinations thereof. According to a preferred embodiment, the at least one rubber latex is selected from the group consisting of natural rubber latex (NR), styrene-butadiene rubber latex (SBR), ethylene-propylene-diene rubber latex (EPDM), butyl rubber latex (IIR), styrene-butadiene-vinylpyridine rubber latex (VP), nitrile butadiene rubber latex (NBR), chloroprene rubber latex (CR), isoprene rubber latex (IR), butadiene rubber latex (BR), functionalized rubber latex and combinations thereof. The functionalization can be any suitable functionalization, except for carboxylation. According to a particularly preferred embodiment of the present invention, the rubber latex is selected from styrene-butadiene-vinylpyridine rubber latex (VP), styrene-butadiene rubber latex (SBR) and combinations thereof.

The styrene-butadiene-vinylpyridine rubber latex (VP) can be any suitable styrene-butadiene-vinylpyridine rubber latex. A preferred example of a styrene-butadiene-vinylpyridine rubber latex is a latex which comprises 10-20% vinylpyridine, 10-20% styrene and 60-80% butadiene monomers. Preferably, the butadiene component is selected from the group consisting of 1,3-butadiene and 2-methyl-1,3-butadiene. The styrene component is preferably selected from the group consisting of styrene, α-methylstyrene, 2-methylstyrene, 3-methylstyrene, 4-methylstyrene, 2,4-diisopropylstyrene, 2,4-dimethylstyrene, 4-t-butylstyrene and hydroxymethylstyrene. The vinylpyridine monomer is preferably selected from the group consisting of 2-vinylpyridine, 3-vinylpyridine, 4-vinylpyridine, 2-methyl-5-vinylpyridine and 5-ethyl-2-vinylpyridine.

According to a particularly preferred embodiment of the present invention, the rubber latex of the claimed aqueous dipping composition is a mixture of various latices. For example, the rubber latex can comprise a styrene-butadiene-vinylpyridine rubber latex and a styrene-butadiene latex. Especially by means of a styrene-butadiene latex as further latex, optimization of the composition is possible without losses in the properties.

The claimed aqueous dipping composition comprises 4% to 50% by weight (dry weight) of the at least one rubber latex, preferably 4.5% to 25% by weight (dry weight) and particularly preferred 5% to 20% by weight (dry weight), based on the total weight of the aqueous dipping composition. The total weight of the aqueous dipping composition also includes the weight of the water of the aqueous composition.

The claimed aqueous dipping composition further comprises at least one blocked isocyanate. The at least one blocked isocyanate can be any suitable blocked isocyanate. According to the present invention, the blocked isocyanate is an isocyanate compound in which the isocyanate group is blocked either by a blocking agent or by a dimerization or association to a higher homologue ("self-blocking"). Preferably, the at least one blocked isocyanate is a polyisocyanate which contains thermally dissociating blocked isocyanate groups. According to a preferred embodiment of the present invention, the isocyanate group is blocked with a blocking agent selected from the group consisting of phenol, thiophenol, chlorophenol, cresol, resorcinol, p-sec-butylphenol, p-tert-butylphenol, p-sec-amylphenol, p-octylphenol, p-nonylphenol, tert-butyl alcohol, diphenylamine, dimethylaniline, phthalimide, δ-valerolactam, ε-caprolactam, dialkyl malonate, acetylacetone, alkyl acetoacetate, acetoxime, methyl ethyl ketoxime, 3,5-dimethylpyrazole, cyclohexanone oxime, 3-hydroxypyridine, acidic sodium sulfite and combinations thereof.

According to a preferred embodiment of the present invention, the at least one blocked isocyanate comprises units selected from the group consisting of tetramethylene diisocyanate, hexamethylene diisocyanate, diphenylmethane 4,4'-diisocyanate, octamethylene diisocyanate, decamethylene diisocyanate, dodecamethylene diisocyanate, aromatic diisocyanates comprising toluene 2,4- or 2,6-diisocyanate, tetramethylxylylene diisocyanate, p-xylene diisocyanate, 2,4'- or 4,4'-diisocyanatodiphenylmethane, phenyl 1,3- or 1,4-diisocyanate and combinations thereof.

The claimed aqueous dipping composition comprises 0.1% to 10% by weight (dry weight) of the at least one blocked isocyanate, preferably 0.2% to 4.5% by weight (dry weight) and particularly preferred 0.5% to 3.5% by weight (dry weight), based on the total weight of the aqueous dipping composition. The total weight of the aqueous dipping composition also includes the weight of the water of the aqueous composition.

The claimed aqueous dipping composition further comprises at least one wax. The at least one wax can be any suitable wax which is known to the person skilled in the art. According to a preferred embodiment of the present invention, the wax is selected from the group consisting of paraffin wax, microcrystalline wax, synthetic wax, wax from natural source such as from honey bees, and combinations thereof. More specifically, the waxes can include branched and/or unbranched hydrocarbons, having the main fraction (i.e. the middle 80% fraction) with a carbon chain length from C15 to C100.

The claimed aqueous dipping composition comprises 0.3% to 30% by weight (dry weight) of the at least one wax, preferably 0.5% to 15% by weight (dry weight) and particularly preferred 1 to 5% by weight (dry weight), based on the total weight of the aqueous dipping composition. The total weight of the aqueous dipping composition also includes the weight of the water of the aqueous composition.

The aqueous dipping composition according to the present invention may further comprise at least one epoxy group-containing compound. The at least one epoxy group-containing compound can be any suitable epoxy group-containing compound, for example glycidyl ether epoxy resin, glycidyl-based glycerol such as polyglycerol glycidyl ether epoxy resin, sorbitol-based epoxy compounds such as sorbitol epoxy resin, phenol-based novolak epoxy compounds such as bisphenol A epoxy resin, cresol-based novolak epoxy compounds such as m-cresol epoxy resin and combinations thereof. According to a preferred embodiment, the at least one epoxy group-containing compound is selected from the group consisting of glycidyl-based glycerol, sorbitol-based epoxy compounds, phenol-based novolak epoxy compounds, cresol-based novolak epoxy compounds and combinations thereof. A particularly suitable example is a glycerol-based polyglycidyl ether, for example Denacol™ EX-313, which is described inter alia in DE 69 722 388 T2.

The claimed aqueous dipping composition may comprise the at least one epoxy group-containing compound in an amount of 0% to 6% by weight (dry weight). According to a first preferred embodiment, the composition contains no epoxy group-containing compound. This makes the production process for the dipping composition more straightforward and is also advantageous from a cost perspective. According to a different preferred embodiment, the claimed composition contains the at least one epoxy group-containing compound. In this case, the epoxy group-containing compound is contained in the composition in an amount of more than 0% and up to 6% by weight (dry weight), preferably in an amount of 0.2% to 4% by weight (dry weight), more preferably in an amount of 0.5% to 2.5% by weight (dry weight), based on the total weight of the aqueous dipping composition. The total weight of the aqueous dipping composition also includes the weight of the water of the aqueous composition. The addition of such an amount of epoxy group-containing compound further improves the adhesion of the textile reinforcing material to the elastomeric compound.

The aqueous dipping composition according to the present invention may further comprise at least one polymer with carboxylic acid functional groups. This polymer with carboxylic acid functional groups can further improve the bonding of the textile reinforcing material to the elastomeric compound. The polymer with carboxylic acid functional groups can be any suitable polymer with carboxylic acid functional groups and preferably contains 50 to 100 mol % of monomers containing carboxylic acid groups. According to a preferred embodiment, the polymer with carboxylic acid functional groups contains 70 to 100 mol %, particularly preferred 90 to 100 mol % of monomers containing carboxylic acid groups. In a particularly preferred embodiment of the invention, the polymer with carboxylic acid functional groups is based to an extent of 100 mol % on monomers containing carboxylic acid groups, without ruling out further functional groups. The polymer with carboxylic acid functional groups can have any suitable molecular weight. Preferably, the polymer with carboxylic acid functional groups has a weight-average molecular weight Mw by GPC of 1,000 to 500,000 g/mol, preferably 3,000 to 100,000 g/mol.

According to a preferred embodiment of the present invention, the polymer with carboxylic acid functional groups is based on monomers selected from acrylic acid, methacrylic acid, esters of acrylic acid, esters of methacrylic acid, itaconic acid, crotonic acid, cinnamic acid, maleic acid and combinations thereof. In a particularly preferred embodiment, the polymer with carboxylic acid functional groups is an acrylic resin.

In addition, it is also possible to use a carboxylated rubber latex as the polymer with carboxylic acid functional groups, wherein "carboxylated" means that said latex bears carboxylic acid groups as functional groups. The rubber latex can be any of the rubber latices mentioned above, as long as it includes additional carboxylic acid functional groups. In other words, as soon as one of the above-mentioned rubber latices contains carboxylic acid functional groups, it is considered as polymer with carboxylic acid functional groups within the meaning of the present invention, and not as one of the above-defined rubber latices. For example, an ethylene-acrylate rubber latex, a carboxylated nitrile rubber latex, a carboxylated styrene-butadiene-vinylpyridine rubber latex and/or a carboxylated styrene-butadiene latex can be used as the polymer with carboxylic acid functional groups. If the polymer with carboxylic acid functional groups is a carboxylated rubber latex, the latex preferably contains 1 to 15 mol % of monomers containing carboxylic acid groups.

The polymer with carboxylic acid functional groups may include a polyalcohol as crosslinker, and suitable polymers with carboxylic acid functional groups and polyalcohol crosslinkers are available, for example, under the Acrodur 950 L and Acrodur DS 3530 trade names from BASF Corp.

The claimed aqueous dipping composition may comprise the at least one polymer with carboxylic acid functional groups in an amount of 0% to 15% by weight (dry weight). According to a preferred embodiment, the aqueous dipping composition comprises the at least one polymer with carboxylic acid functional groups in an amount of 0.1% to 2% by weight (dry weight), more preferably in an amount of 0.2 to 0.4% by weight (dry weight), based on the total weight of the aqueous dipping composition. The total weight of the aqueous dipping composition also includes the weight of the water of the aqueous composition.

According to a preferred embodiment of the present invention, the claimed dipping composition comprises 4.5% to 25% by weight (dry weight) of the at least one rubber latex, 0.2% to 4.5% by weight (dry weight) of the at least one blocked isocyanate, 0.3% to 5% by weight (dry weight) of the at least one wax, 0% to 4% by weight (dry weight) of the at least one epoxy group-containing compound, and 0% to 2% by weight (dry weight) of the at least one polymer with carboxylic acid functional groups, wherein the amounts in % by weight are based on the total weight of the aqueous dipping composition. According to a particularly preferred embodiment, the claimed dipping composition comprises 4.5% to 25% by weight (dry weight) of the at least one rubber latex, 0.2% to 4.5% by weight (dry weight) of the at least one blocked isocyanate, 0.3% to 5% by weight (dry weight) of the at least one wax, 0.2% to 4% by weight (dry weight) of the at least one epoxy group-containing compound, and 0.1% to 2% by weight (dry weight) of the at least one polymer with carboxylic acid functional groups, wherein the amounts in % by weight are based on the total weight of the aqueous dipping composition. More specifically, the claimed dipping composition may be a composition which comprises 4.5% to 25% by weight (dry weight) of the at least one rubber latex, 0.2% to 4.5% by weight (dry weight) of the at least one blocked isocyanate, 0.3% to 5% by weight (dry weight) of the at least one wax, 0.2% to 4% by weight (dry weight) of the at least one epoxy group-containing compound selected from the group consisting of glycidyl-based glycerol, sorbitol-based epoxy compounds, phenol-based novolak epoxy compounds, cresol-based novolak epoxy compounds and combinations thereof, and 0.1% to 2% by weight (dry weight) of the at least one polymer with carboxylic acid functional groups based on monomers selected from acrylic acid, methacrylic acid, esters of acrylic acid, esters of methacrylic acid, itaconic acid, crotonic acid, cinnamic acid, maleic acid and combinations thereof, wherein the amounts in % by weight are based on the total weight of the aqueous dipping composition.

According to a further particularly preferred embodiment, the claimed dipping composition comprises 5% to 20% by weight (dry weight) of the at least one rubber latex, 0.5% to 3.5% by weight (dry weight) of the at least one blocked isocyanate, 1% to 5% by weight (dry weight) of the at least one wax, 0% to 4% by weight (dry weight) of the at least one epoxy group-containing compound, and 0% to 2% by weight (dry weight) of the at least one polymer with carboxylic acid functional groups, wherein the amounts in % by weight are based on the total weight of the aqueous dipping composition. According to a particularly preferred embodiment, the claimed dipping composition comprises 5% to 20% by weight (dry weight) of the at least one rubber latex, 0.5% to 3.5% by weight (dry weight) of the at least one blocked isocyanate, 1% to 5% by weight (dry weight) of the at least one wax, 0.2% to 4% by weight (dry weight) of the at least one epoxy group-containing compound, and 0.1% to 2% by weight (dry weight) of the at least one polymer with carboxylic acid functional groups, wherein the amounts in % by weight are based on the total weight of the aqueous dipping composition. More specifically, the claimed dipping composition may be a composition which comprises 5% to 20% by weight (dry weight) of the at least one rubber latex, 0.5% to 3.5% by weight (dry weight) of the at least one blocked isocyanate, 1% to 5% by weight (dry weight) of the at least one wax, 0.2% to 4% by weight (dry weight) of the at least one epoxy group-containing compound selected from the group consisting of glycidyl-based glycerol, sorbitol-based epoxy compounds, phenol-based novolak epoxy compounds, cresol-based novolak epoxy compounds and combinations thereof, and 0.1% to 2% by weight (dry weight) of the at least one polymer with carboxylic acid functional groups based on monomers selected from acrylic acid, methacrylic acid, esters of acrylic acid, esters of methacrylic acid, itaconic acid, crotonic acid, cinnamic acid, maleic acid and combinations thereof, wherein the amounts in % by weight are based on the total weight of the aqueous dipping composition.

The dipping composition according to the present invention may further comprise a base. More specifically, the base can be added to set the pH of the dipping composition to a range of 5 to 11, preferably to a range of 7 to 10. A pH of at least 5 advantageously avoids the formation of any agglomerates. Preferably, the base is selected from the group consisting of ammonium hydroxide (i.e. an aqueous solution of ammonia), alkali hydroxide (in particular sodium hydroxide) and combinations thereof. The base is preferably a volatile base which evaporates, or the constituents of which evaporate, during a heat treatment step. The addition of the base may further contribute to the stability of the dipping composition.

The aqueous dipping composition according to the present invention may also comprise further additives. For example, the composition may comprise an additive such as colorants, catalysts of isocyanate deblocking or trimerization reactions, catalysts of reactions between isocyanate and an epoxy group-containing and/or hydroxyl group-containing compound or a polymer with carboxylic acid functional groups, catalysts of reactions between a polymer with carboxylic acid functional groups and an epoxy group-containing and/or hydroxyl group-containing compound, and combinations thereof. The colorants include pigments and dyes. Suitable catalysts of isocyanate deblocking or trimerization reactions and catalysts of reactions between isocyanate and an epoxy group-containing and/or hydroxyl group-containing compound or a polymer with carboxylic acid functional groups are known to the person skilled in the art and are described in various literature, e.g. in (1) Blank, W. J., He, Z. A., Hessell, E. T. (1999): Catalysis of the Isocyanate-Hydroxyl Reaction by Non-Tin Catalysts. Progress in Organic Coatings, 35 (1-4), 19-29; (2) US 2010/0151138 A1; (3) Ward, B. D. et al. (2019): Aluminium-catalysed isocyanate trimerization, enhanced by exploiting a dynamic coordination sphere. Chem. Commun., 55, 7679-7682; (4) Gürtler, C., Danielmeier, K. (2004): catalyst system for the reaction of carboxylic acids with aliphatic isocyanates. Tetrahedron Letters, 45, 2515-2521; (5) Libni, G., Nasar, A. S. (2017): Catalysis of Forward and Reverse Reactions of ε-Caprolactam-Blocked Polyisocyanate: Double Arrhenius Plots and Equilibrium Temperatures of a Thermally Reversible Reaction. Chemistry Select, 2, 9586-9594. Suitable catalysts of reactions between a polymer with carboxylic acid functional groups and an epoxy group-containing and/or hydroxyl group-containing compound are known to the person skilled in the art and are described in various literature, e.g. in (1) Blank, W. J., He, Z. A., Picci, M. (2002): Catalysis of the epoxy-carboxyl reaction. Journal of Coatings Technology, 74, 33-41; (2) Matsumoto, K., Yanagi, R., Oe, Y.: Chapter 2: Recent Advances in the Synthesis of Carboxylic Acid Esters. In: Badea, G.-I., Radu, G. L. (Eds), Carboxylic Acid Key Role in Life Sciences, 2018.

The composition may also comprise a filler. The optional at least one filler can be any suitable material which is known in the art for use as a filler. Preferably, the filler to be used in the compositions of the present invention is water-dispersible. Suitable examples for fillers are in particular water-dispersible inorganic fillers, such as oxides, hydroxides, carbonates, sulfates, sulfides, carbon black, graphite, graphene, fullerenes, carbon nanotubes and combinations thereof.

Suitable oxides include, for example, silica, silicate, alkaline earth oxides such as calcium oxide and magnesium oxide, zinc oxide, titanium dioxide, aluminium oxide and combinations thereof. The preferred oxides are silica, silicate, aluminium oxide (for example the commercially available Aerodisp W440, Evonik), titanium dioxide (for example the commercially available Aerodisp W740X, Evonik) and zinc oxide. Suitable silicas include, for example, precipitated silica, fumed silica, dispersed silica, colloidal silica, functionalized silica and combinations thereof. The silica can have any suitable specific surface area. Preferably, the silica to be used has a BET specific surface area (determined according to ISO 9277:2010) of 30 to 450 $m^2/g$, more preferably of 120 to 410 $m^2/g$. Suitable commercially available silicas include, for example, Aerosil 300 (Evonik; a fumed silica with a specific surface area of 300 $m^2/g$), Aerodisp W7520 (Evonik; an aqueous dispersion of hydrophilic fumed silica with a specific surface area of 200 $m^2/g$), LevasilCT16APL (Nouryon; a colloidal silica, sodium stabilized with a specific surface area of 160 $m^2/g$), LevasilCT16PNL (Nouryon, a colloidal silica, ammonia stabilized, specific surface area of 160 $m^2/g$) or Dispercoll S3030/1 (Covestro, an aqueous anionic colloidal solution of amorphous silica, sodium stabilized, specific surface area of 300 $m^2/g$). Suitable silicates include, for example, alkali silicate, alumino silicate, polymeric silicate and combinations thereof. The alkali silicate is preferably sodium silicate.

Suitable hydroxides include, for example, alkaline earth hydroxides such as magnesium oxide, aluminium hydroxide and combinations thereof. Suitable carbonates include, for example, alkaline earth carbonates such as calcium carbonate, magnesium carbonate and combinations thereof. Suitable sulfates include, for example, alkaline earth sulfates such as barium sulfate. Suitable sulfides include, for example, iron sulfide. Suitable carbon blacks include, for example, acetylene black, thermal black, channel black, gas black, furnace black, lamp black, pyrolytic carbon black and combinations thereof. Also the graphites, graphenes, fullerenes and carbon nanotubes to be used as a filler in accordance with the present invention can be any suitable graphites, graphenes, fullerenes and carbon nanotubes, respectively.

It is noted that the above fillers can be used in synthetic or pure form, or alternatively in natural form. For example, also natural minerals, which contain one or more of the above-mentioned compounds as the main component(s), can be used as the filler. Accordingly, if the filler is calcium carbonate, this can also be used in the form of chalk, dolomite or calcite. If the filler is silicate, this can also be used in the form of clay, talcum powder, mica powder or kaolin.

According to a particularly preferred embodiment of the present invention, the at least one filler is selected from the group consisting of silica, silicate, carbon black, graphite, graphene, fullerenes, carbon nanotubes, alkaline earth carbonates, alkaline earth oxides, zinc oxide, titanium dioxide, aluminum oxide, alkaline earth hydroxides, aluminum hydroxide and combinations thereof. The most preferred fillers according to the present invention are silica, silicate, carbon black, zinc oxide and combinations thereof.

The claimed aqueous dipping composition may preferably comprise 0.02% to 20% by weight (dry weight) of the at least one filler, preferably 0.1% to 10% by weight (dry weight) and particularly preferred 0.5 to 5% by weight (dry weight), based on the total weight of the aqueous dipping composition. The total weight of the aqueous dipping composition also includes the weight of the water of the aqueous composition. The composition may further also comprise tackifiers and/or anti-foaming agents and/or wetting agents. These additives can be used in suitable amounts which are generally dependent on the textile reinforcing material treated with the aqueous dipping composition and on processing parameters.

As compared to the prior art dipping compositions, the dipping composition according to the present invention is essentially free of resorcinol, resorcinol precondensates, formaldehyde and formaldehyde-releasing substances. In the context of the present invention, the term "essentially free of" is to be understood in that these substances are allowed to be present only in amounts which do not materially affect the essential characteristics of the claimed composition. For example, the amount of these substances shall not go beyond trace amounts arising from some contamination. Typically, not more than 0.1% by weight (dry weight), based on the total weight of the aqueous composition, of each of resorcinol, resorcinol precondensates, formaldehyde and formaldehyde-releasing substances shall be contained in the claimed dipping composition, i.e. 0.1% by weight is the maximum amount individually for each of the above components. Preferably, the content of resorcinol, resorcinol precondensates, formaldehyde and formaldehyde-releasing substances in the claimed dipping composition is 0% by weight. The claimed composition which is essentially free of resorcinol, resorcinol precondensates, formaldehyde and formaldehyde-releasing substances is advantageous, since it avoids the use of these compounds which are harmful to the environment and health.

The dipping composition according to the present invention is further characterized in that the weight ratio of rubber latex to the sum of blocked isocyanate, epoxy group-containing compound and polymer with carboxylic acid functional groups is at least 2. According to a preferred embodiment of the present invention, the weight ratio of rubber latex to the sum of blocked isocyanate, epoxy group-containing compound and polymer with carboxylic acid functional groups is in the range of 3 to 20. It is particularly preferred that this ratio is in the range of 3.5 to 8.

The blocked isocyanate, the epoxy group-containing compound and the polymer with carboxylic acid functional groups are resin-forming components. It has now surprisingly been found that a weight ratio of the rubber latex to these resin-forming components of at least 2 is advantageous from a processing perspective, i.e. the compositions are easy to handle and can be well processed. In particular, the lowering of the amounts of the above-mentioned resin-forming components (by increasing the above ratio to a value of at least 2) leads to a reduction of dirt in the production and to a reduction of the stickiness to the rolls. All these advantages improve the production process. Also the interaction with the rubber phase is improved when using a ratio of at least 2. Finally, the use of a ratio of at least 2 leads to a reduced stiffness and to better flex properties as compared to prior art compositions applying ratios below 2.

The dipping composition of the present invention can have any suitable solid content. Preferably, the composition has a solid content of 6 to 30% by weight (dry weight), preferably of 7 to 27% by weight (dry weight).

The dipping composition of the present invention can be prepared by any suitable method. Generally, the various components of the dipping composition (in solid form or in the form of aqueous solutions) are simply combined to give the composition. The various components can be combined simultaneously or added subsequently one after another, or various components can be added in groups or in any suitable way known to the skilled person. According to a preferred embodiment, the at least one wax is added as the first component to the water, and the other components are added (simultaneously or one after another or grouped) thereafter. According to a different preferred embodiment, all components, except for the at least one wax, are added first (simultaneously or one after another or grouped), and then the at least one wax is added as the last component. For all methods of preparing the claimed dipping composition, it is generally advantageous to mix the various components under stirring. Moreover, it is also preferred that the at least one rubber latex is added at a pH in the range of 5 to 11 in order to avoid the formation of agglomerates. The preparation of the claimed dipping composition is generally done around ambient temperature, i.e. in the range of 20° C. to 25° C. However, it is also possible to do the preparation (i.e. the mixing of the various components) at lower temperatures, preferably in a range of 5° C. to less than 20° C., or at higher temperatures, preferably in the range of more than 25° C. to 45° C.

According to a particularly preferred embodiment of the present invention, the method of preparing the claimed dipping composition comprises the steps of (i) providing water, (ii) optionally adding a base, (iii) optionally adding the at least one polymer with carboxylic acid functional groups (iv) optionally adding the at least one epoxy group-containing compound, (v) adding the at least one blocked isocyanate, (vi) adding the at least one rubber latex to the composition, and (vii) optionally adding the colorant and/or the filler, wherein the at least one wax is added either prior to step (ii) or after step (vii).

The present invention further relates to the use of the aqueous dipping composition according to the present invention for coating a textile reinforcing material. This textile reinforcing material can be any suitable textile reinforcing member. According to a preferred embodiment of the present invention, the textile reinforcing material is based on a material selected from the group consisting of polyesters, polyamides, polyurethanes, glass, carbon, celluloses, polycarbonates, polyketones and combinations thereof. Suitable polyesters include, for example, polyethylene terephthalate (PET), polyethylene naphthalate (PEN), polybutylene terephthalate (PBT), polyethylene furanoate (PEF). Examples for polyamides include nylon-4,6 (PA 4.6), nylon-4,10 (PA 4.10), nylon-6 (PA 6), nylon-6,6 (PA 6.6 polyhexamethyleneadipamide), nylon-6,12 (PA 6.12), nylon-10,10 (PA 10.10) and nylon-12,12 (PA 12.12). Suitable polyamides further include aromatic polyamides such as aramides, in particular m-aramid, p-aramid and mixtures of m-aramid and p-aramid. Suitable celluloses include, for example, regenerated celluloses (in particular viscose or rayon) and cellulose esters. The most preferred materials for the textile reinforcing material are polyester, rayon, aramid, nylon and combinations thereof.

It is also possible to use a textile reinforcing material which has been activated by means of an adhesive. Suitable adhesive activated (aa) reinforcing materials are known to the person skilled in the art. For example, the textile reinforcing material can be an adhesive activated aramid.

The textile reinforcing material can be of any suitable form. For example, the textile reinforcing material can be in the form of single- or multifilament textile cords, or in the form of flat filament constructions like tapes, based on single- or multifilament yarns. According to a preferred embodiment of the present invention, the textile reinforcing material comprises cords having at least one twisted yarn. Suitable finenesses (titre in the unit dtex) and ways of twisting the cords and yarns are known in the prior art. For example, the titre of each yarn may be between 200 and 5000 dtex and the twist of the yarns and cords may be between 100 and 800 t/m. The textile reinforcing material may also be made of cords each made from one yarn, which means that one twisted yarn constitutes each cord. Alternatively, it is also possible that the cords are made from at least two, more preferably exactly two yarns. According to another preferred embodiment of the present invention, the textile reinforcing material is in the form of flat filament constructions such as tapes. The shape of the filaments may vary, and also the final shape of the yarn itself may vary. The filament dtex can be in any suitable range and is preferably between 1 and 30 dtex.

The present invention further relates to a process for coating a textile reinforcing material, comprising the steps of treating a textile reinforcing material with the dipping composition according to the present invention; and heat-treating the composition. The textile reinforcing material to be used in this process may be any suitable textile reinforcing material. Preferably, the textile reinforcing material is the one already described above. The treating with the dipping composition can be done in any suitable way known to the person skilled in the art. For example, the treating can be done by dipping, spraying or applying the dipping composition to the textile reinforcing material with a suitable device such as a brush or similar device. Preferably, the treating is done by dipping, for example by preparing a bath with the dipping composition and dipping the textile reinforcing material into this bath. It is also possible to perform two or more steps of treating the textile reinforcing material with the dipping composition according to the present invention. According to a particularly preferred embodiment of the present invention, the textile reinforcing material is dipped twice with the dipping composition according to the present invention.

The step of heat-treating the composition means heat-treating the textile reinforcing material which has been treated with the composition in the previous step. The heat-treating can be done at any suitable temperature. According to a preferred embodiment, the heat-treating is done at a temperature in the range of from 60 to 260° C., more preferably in the range of from 160 to 250° C. The heat-treatment can be effected by any suitable means. It is particularly preferred to effect the heat-treatment by hot-drawing. This can be done using known devices, such as especially 1- or 2-zone ovens, through which the textile reinforcing material is preferably passed continuously. According to a preferred embodiment of the process of the present invention, two or more thermal treatments at the same or different temperatures are conducted in succession.

Generally, it is sufficient to perform only one coating step. However, dependent on the used textile reinforcing material and the desired properties, an additional activation step can optionally be performed prior to the above-described treating with the claimed dipping composition. Especially in the case of non-preactivated textile materials, it is preferred to treat the textile reinforcing material in a bath comprising one or more epoxy compounds and/or one or more polyisocyanate compounds prior to the treatment with the dipping composition according to the present invention. This results in an additional dipping step, but at the same time the activation of bonding of the textile reinforcing material for attachment to a rubber mixture/rubberizing mixture is further optimized. According to a particularly preferred embodiment of the present invention, the textile reinforcing material is preactivated by means of a pre-dipping step in a bath comprising one or more epoxy compounds and/or one or more polyisocyanate compounds, followed by a single dipping with the composition according to the present invention.

The present invention further relates to a coated textile reinforcing material obtained from the above process.

A further advantage of the invention is that the coated textile reinforcing material, especially cord, can be provided in various colours through addition of colorants, in particular pigments (which are water-dispersible) and/or dyes (which are soluble in water). This can be utilized, for instance, for better marketing of products or in the further processing of the coated textile reinforcing material. For example, the colorization of the coated textile reinforcing material can be used for improved differentiation in further processing, still having the possibility to check the quality of the dip e.g. that there are no damages on the surface, if the dip is well distributed.

The present invention further relates to an elastomeric article comprising (i) at least one elastomeric compound and (ii) the coated textile reinforcing material obtained by the above method or a textile reinforcing material that is coated with the claimed heat-treated dipping composition. The elastomeric article can be any suitable elastomeric article. Preferably, the elastomeric article is a tire or a rubber article, such as a belt, a conveyor belt, a transmission belt, a drive belt, a hose, a strip belt, a transport belt, or an air bellow.

The elastomeric article according to the present invention can be obtained by any suitable method. For example, this elastomeric article can be obtained by a method comprising the steps of (i) providing a coated textile reinforcing material as described above, (ii) combining the coated textile reinforcing material with a rubberizing mixture to give a green elastomeric article, and (iii) vulcanizing the green elastomeric article to result in the elastomeric article comprising the coated textile reinforcing material and the elastomeric compound.

According to step (ii) of this process, the coated textile reinforcing material is combined with a rubberizing mixture. This combining can be done, for example, by coating the coated textile reinforcing material with the rubberizing mixture, or by calendering the coated textile reinforcing material together with the rubberizing mixture. It is also possible to press the coated textile reinforcing material into the rubberizing mixture. The rubberizing mixture can be any suitable rubberizing mixture.

Preferably, the rubberizing mixture comprises at least one diene rubber. The diene rubber may be any suitable diene rubber known to the person skilled in the art. Preferably, the rubberizing mixture comprises at least one diene rubber selected from the group consisting of natural polyisoprene (NR), synthetic polyisoprene (IR), butadiene rubber (BR), styrene-butadiene rubber (SBR) and combinations thereof. For example, the polyisoprene (IR, NR) may be either cis-1,4-polyisoprene or 3,4-polyisoprene. Preference is given, however, to the use of cis-1,4-polyisoprenes with a cis-1,4 content >90% by weight. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight. The polybutadiene (BR) may be either cis-1,4-polybutadiene or vinyl polybutadiene (vinyl content about 10% to 90% by weight). Preference is given to the use of cis-1,4-polybutadiene with a cis-1,4 content greater than 90% by weight, which can be prepared, for example, by solution polymerization in the presence of catalysts of the rare earth type. The styrene-butadiene copolymers (SBR) may be solution-polymerized styrene-butadiene copolymers (S-SBR) having a styrene content, based on the polymer, of about 10% to 45% by weight and a vinyl content (content of 1,2-bonded butadiene, based on the overall polymer) of 10% to 70% by weight, which can be prepared, for example, using lithium alkyls in organic solvent. The S-SBR may also be coupled and end group-modified. It is alternatively possible to use emulsion-polymerized styrene-butadiene copolymers (E-SBR) and mixtures of E-SBR and S-SBR. The styrene content of the E-SBR is about 15% to 50% by weight, and it is possible to use the products known from the prior art that have been obtained by copolymerization of styrene and 1,3-butadiene in aqueous emulsion.

The diene rubbers used in the mixture, especially styrene-butadiene copolymers, can also be used in partly or fully functionalized form. The functionalization can be effected with groups which can interact with the fillers used, especially with fillers bearing OH groups. Functionalizations may, for example, be those with hydroxyl groups and/or epoxy groups and/or siloxane groups and/or amino groups and/or phthalocyanine groups and/or carboxyl groups and/or silane sulfide groups.

The rubberizing mixture preferably contains 25 to 100 phr, more preferably 50 to 100 phr, still more preferably in turn 70 to 100 phr, of diene rubber. According to a particularly preferred embodiment, the rubberizing mixture contains 100 phr of at least one natural polyisoprene (NR) and/or synthetic polyisoprene (IR), which means that a mixture of NR and IR is also conceivable. According to another particularly preferred embodiment, the rubberizing mixture contains 25 to 85 phr of at least one natural and/or synthetic polyisoprene, 15 to 50 phr of at least one butadiene rubber and/or 15 to 50 phr of at least one styrene-butadiene rubber. Especially with these rubbers, and especially in strengthening member plies of motor vehicle tyres, very good physical properties of the rubberizing mixture are found in terms of processability, service life and tear properties, while an adequate level of bonding is achieved.

The rubberizing mixture preferably further comprises at least one filler selected from the group consisting of carbon black, silica and combinations thereof. This filler is preferably contained in the rubberizing mixture in an amount of 20 to 90 phr, more preferably in an amount of 40 to 80 phr. The expression phr (parts per hundred parts of rubber by weight) used in this context is the standard unit of amounts for blend recipes in the rubber industry. The dosage of the parts by weight of the individual substances is always based here on 100 parts by weight of the total mass of all rubbers present in the mixture. The mass of all rubbers present in the mixture adds up to 100. The rubberizing mixture may further comprise 0.1 to 10 phr of additional fillers such as aluminosilicates, chalk, starch, magnesium oxide, titanium dioxide, rubber gels, carbon nanotubes (CNT), graphite and graphenes and combinations thereof. Preferably, however, the rubberizing mixture is free of these additional fillers, i.e. contains preferably 0 to 0.001 phr of these further fillers.

The rubberizing mixture preferably further comprises at least one additive. Suitable additives include aging stabilizers, activators, waxes, resins, especially tackifying resins that are not plasticizer resins, masticating aids, processing aids, plasticizers and combinations thereof.

The method for producing the elastomeric article further comprises the vulcanization step (iii). The vulcanization may be conducted in the presence of sulfur and/or sulfur donors, and some sulfur donors can simultaneously act as vulcanization accelerators. Sulfur or sulfur donors may be added to the rubberizing mixture in the amounts that are commonly used by the person skilled in the art (0.4 to 8 phr, sulfur preferably in amounts of 0.4 to 4 phr). The vulcanization can also be effected in the presence of very small amounts of sulfur in combination with sulfur donor substances. The vulcanization can be carried out at any suitable temperature, preferably at a temperature in the range of 100 to 250° C., preferably at a temperature in the range of 130 to 180° C., wherein optionally a pressure in the range of 10 to 200 bar can be applied.

The present invention is further described in the following with reference to examples which, however, are not limiting the scope of the invention.

EXAMPLES

Examples 1 to 5

Cords made from polyester (polyethylene terephthalate (PET), 2-plied, 1440 dtex, 375×375 twisted, non adhesive activated) were pretreated by dipping the cord into a pre-dip composition containing 95.26% by weight of water, 0.90% by weight of Denacol EX313 (an epoxy compound) and 3.84% by weight of Grilbond IL-6 (a polyisocyanate compound) and heat-treated at a temperature between 210 and 250° C. After treatment with the pre-dip composition, the cords were dipped with the aqueous dipping composition according to Example 1 (reference example) and Examples 2 to 5 (according to the present invention), respectively. The dipping compositions of Examples 1 to 5 were prepared by adding the various components under stirring at ambient temperature in the amounts given in the following Table 1, in the following addition order (if one chemical is not part of the recipe according to Table 1, the subsequent component was added, and so on):

Water→ammonia→carboxylic resin→epoxy compound→isocyanate→SBR latex→VP latex→carbon black→wax The dipped cords were then passed through two additional furnaces. The temperature of the first furnace was kept between 170 and 220° C.; the temperature of the second furnace was kept between 200° C. and 250° C. It is noted that Table 1 provides the total amount (in parts by weight) of the added components and not the dry weight.

TABLE 1

|  | Ex. 1 (Ref.) | Ex. 2 | Ex. 3 | Ex. 4 | Ex. 5 |
|---|---|---|---|---|---|
| VP latex[a] | 37.32 | 36.06 | 37.24 | 35.67 | 34.67 |
| SBR latex[b] | 6.59 | 6.36 | 6.57 | 6.30 | 6.12 |
| Isocyanate[c] | 4.71 | 4.55 | 4.52 | 4.33 | 4.20 |
| Ammonia[d] | — | — | 0.13 | 0.13 | 0.12 |
| Carboxylic resin[e] | — | — | 0.36 | 0.34 | 0.33 |
| Epoxy compound[f] | 1.67 | 1.62 | 1.60 | 1.54 | 1.49 |
| Carbon black[g] | — | — | — | — | 4.94 |
| Hydrowax-Q[h] | — | 4.45 | 0.21 | 4.40 | 2.14 |
| Water | 49.71 | 46.96 | 49.37 | 47.30 | 45.97 |
| Total | 100 | 100 | 100 | 100 | 100 |
| Latex/resin | 4.0 | 4.0 | 4.0 | 4.0 | 4.0 |
| Dip solid % | 22.5 | 24.1 | 22.6 | 23.9 | 23.2 |

[a]Copolymer of butadiene, styrene and 2-vinylpyridine, containing approximately 15% per weight of vinylpyridine bound in the polymer, aqueous dispersion, 41% by weight;
[b]Styrene-butadiene copolymer, aqueous dispersion, 41% by weight;
[c]Grilbond IL-6: caprolactam-blocked 4,4'-methylene diphenyl diisocyanate, aqueous dispersion, 60% by weight (EMS-GRILTECH);
[d]Ammonium hydroxide, aqueous solution, 25% by weight;
[e]Acrodur 950L: polyacrylate, aqueous solution, 50% by weight in water (BASF);
[f]Denacol EX313: glycerol-based polyglycidyl ether (Nagase Chemtex);
[g]aqueous carbon black dispersion prepared from N330 carbon black type by ball-milling (particle size: 0.2-0.35 microns), 23.5% by weight;
[h]Hydrowax-Q: aqueous paraffin dispersion, 54% by weight (Sasol).

After dipping and subsequent hot-drawing, the strengthening members were each covered with a rubberizing mixture according to Table 2. A specimen including two plies of fabric bonded with rubber was produced, in order to measure the stripping force required to separate these two plies of fabric bonded with rubber. The cord density was 90 epdm (ends per decimeter). This composite material was then cured at 170° C. under pressure (7.5 bar) for 10 minutes to obtain the final reinforced material/strengthening member.

TABLE 2

| Constituents of rubberizing mixture | Amount, phr |
|---|---|
| Natural rubber | 70 |
| SBR | 30 |
| N660 carbon black | 50 |
| Zinc oxide | 4 |
| Stearic acid | 2 |
| Oil | 5 |
| Penacolite (resorcinol-formaldehyde) | 3 |
| Hexamethoxymethyl melamine | 2 |
| 2,2,4-Trimethyl-1,2-dihydroquinoline (TMQ) | 1.8 |

TABLE 2-continued

| Constituents of rubberizing mixture | Amount, phr |
|---|---|
| Sulphur | 2.5 |
| 2,2'-Dibenzothiazyl disulphide (MBTS) | 0.8 |

For all the strengthening members described, a bonding test with the abovementioned rubberizing mixture was conducted according to ISO 36:2011. The vulcanized samples were heated to 120° C. for 30 min and the bonding test was conducted within 30 seconds after removal from the oven. The results are provided in Table 3, wherein the resultant force values are given in % relative to the initial force value of Reference Example 1 which has been normalized to 100%.

The assessment of the bonding force was conducted according to DIN ISO 6133:2004-05, procedure B. In addition, the separated areas of the test samples were assessed visually on a scale from 1 to 5 using the following coverage rating.

| 1 | 0% | completely free of rubber |
| 2 | 25% | mainly free of rubber |
| 3 | 50% | half covered by rubber |
| 4 | 75% | mainly covered by rubber |
| 5 | 100% | completely covered by rubber |

The side with the poorest coverage was used for the evaluation. In determining the coverage rating, half ratings (i.e., 3.5) were also permitted. For each example, the bonding force reported and the coverage reported are the mean value from three measurements in each case. The results are also provided in Table 3.

Furthermore, also the storage stability/shelf life stability of the textile reinforcing material being treated with the dipping composition according to the present invention was evaluated. As a test of the storage stability of the treated textile reinforcing material under real conditions, an accelerated ageing test was applied by ageing the treated textile reinforcing material at 60° C. for 72 hours, in an air circulating oven. For the accelerated ageing test, the samples were put in the oven wound onto appropriate supports, avoiding stretching, twisting, untwisting or the formation of loops. The winding was loose enough that possible shrinkage could occur during drying without causing tension on the sample. The aged treated textile reinforcing material was then tested in the same manner as the fresh textile reinforcing material treated with the dipping composition according to the present invention. The results are also provided in Table 3. Again, the resultant force values are given in % relative to the initial force value of Reference Example 1 (set to 100%).

TABLE 3

|  | Ex. 1 (Ref.) | Ex. 2 | Ex. 3 | Ex. 4 | Ex. 5 |
|---|---|---|---|---|---|
| Initial adhesion force [%] | 100.0 | 114.4 | -111.7 | 114.4 | 123.0 |
| Initial coverage | 3.5 | 4.0 | 5.0 | 4.5 | 5.0 |
| Aged adhesion force (72 h) | 64.8 | 128.4 | 100.3 | 124.4 | 114.5 |
| Aged coverage (72 h) | 1.5 | 2.5 | 2.5 | 4.5 | 4.5 |

As can be seen from Table 3, the textile reinforcing material being treated with the dipping composition according to the present invention shows improved initial bonding as well as aged bonding and coverage (compare Reference Example 1 with Example 2). The use of a low amount of wax in combination with a base (ammonia) and a carboxylic acid functionalized polymer (carboxylic resin) also leads to an improved initial and aged bonding as well as an improved and aged coverage (compare Reference Example 1 with Example 3). The increase of the amount of wax leads to a further improvement (see Example 4), and the combination with a filler (carbon black) also leads to a further improvement (see Example 5).

Examples 6 to 10

Cords made from Nylon (2-plied, 1400 dtex, 300×300 twisted) were dipped with the aqueous dipping composition according to Example 6 (reference example) and Examples 7 to 10 (according to the present invention), respectively (see Table 4) and passed through three furnaces. The dipping compositions of Examples 6 to 10 were prepared by adding the various components under stirring at ambient temperature in the amounts given in the following Table 4, in the following addition order (if one chemical is not part of the recipe according to Table 4, the subsequent component was added, and so on):

Water→ammonia→carboxylic resin→epoxy compound→isocyanate→SBR latex→VP latex→wax

The temperature of the first furnace was kept between 170 and 220° C.; the temperatures of the second and third furnace were independently kept between 200° C. and 250° C. It is noted that Table 4 provides the total amount (in parts by weight) of the added components and not the dry weight.

TABLE 4

|  | Ex. 6 (Ref.) | Ex. 7 | Ex. 8 | Ex. 9 | Ex. 10 |
|---|---|---|---|---|---|
| VP latex[a)] | 29.02 | 28.26 | 28.02 | 27.50 | 28.12 |
| SBR latex[b)] | 5.12 | 4.98 | 4.94 | 4.85 | 4.96 |
| Isocyanate[c)] | 3.66 | 3.56 | 4.73 | 3.10 | 3.17 |
| Ammonia[d)] | — | — | 0.41 | 0.27 | 0.27 |
| Carboxylic resin[e)] | — | — | 1.08 | 0.71 | 0.73 |
| Epoxy compound[f)] | 1.30 | 1.27 | — | 1.10 | 1.12 |
| Hydrowax-Q[h)] | — | 3.49 | 3.46 | — | 3.47 |
| Acrawax-C[i)] | — | — | — | 5.27 | — |
| Water | 60.89 | 58.44 | 57.36 | 57.20 | 58.16 |
| Total | 100 | 100 | 100 | 100 | 100 |
| Latex/resin | 4.0 | 4.0 | 4.0 | 4.0 | 4.0 |
| Dip solid % | 17.5 | 18.9 | 18.8 | 18.4 | 18.8 |

[a) b) c) d) e) f) h)]See above for examples 1 to 5;
[i)]Acrawax C: N,N' ethylene bis-stearamide-based synthetic wax dispersion, 35% by weight (Lonza).

After dipping and subsequent hot-drawing, the strengthening members were each covered with a rubberizing mixture according to Table 2. A specimen including two plies of fabric bonded with rubber was produced, in order to measure the stripping force required to separate these two plies of fabric bonded with rubber. The cord density was 90 epdm (ends per decimeter). This composite material was then cured at 170° C. under pressure (7.5 bar) for 10 minutes to obtain the final reinforced material/strengthening member.

The obtained strengthening members were tested as described above for Examples 1 to 5. The results are provided in Table 5, wherein the resultant force values are given in % relative to the initial force value of Reference Example 6 which has been normalized to 100%.

TABLE 5

|  | Ex. 6 (Ref.) | Ex. 7 | Ex. 8 | Ex. 9 | Ex. 10 |
|---|---|---|---|---|---|
| Initial adhesion force [%] | 100.0 | 124.9 | 121.9 | 151.7 | 137.3 |
| Initial coverage | 2.0 | 2.5 | 2.5 | 3.5 | 4.3 |
| Aged adhesion force (72 h) | 97.0 | 122.5 | 120.3 | 147.9 | 145.1 |
| Aged coverage (72 h) | 1.0 | 3.0 | 3.2 | 3.5 | 3.0 |

As can be seen from Table 5, the textile reinforcing material being treated with the dipping composition according to the present invention shows improved initial and aged bonding and coverage (compare Reference Example 6 with Examples 7 to 10). More specifically, Example 7 demonstrates an improvement of the addition of a wax alone. This effect is also achieved when the wax is used in combination with a base (ammonia) and a carboxylic acid functionalized polymer (carboxylic resin) instead of the epoxy compound (see example 8). The initial and aged bonding and coverage is further improved when using a wax, an epoxy compound, a base (ammonia) and a carboxylic acid functionalized polymer (carboxylic resin) in combination (see examples 9 and 10).

Further disclosed herein are the following items:

Item 1. An aqueous dipping composition for coating a textile reinforcing material, comprising
  4% to 50% by weight (dry weight) of at least one rubber latex,
  0.1% to 10% by weight (dry weight) of at least one blocked isocyanate,
  0.3% to 30% by weight (dry weight) of at least one wax,
  0% to 6% by weight (dry weight) of at least one epoxy group-containing compound, and
  0% to 15% by weight (dry weight) of at least one polymer with carboxylic acid functional groups,
  wherein the amounts in % by weight are based on the total weight of the aqueous dipping composition,
  wherein the weight ratio of rubber latex to the sum of blocked isocyanate, epoxy group-containing compound and polymer with carboxylic acid functional groups is at least 2, and
  wherein the composition is essentially free of resorcinol, resorcinol precondensates, formaldehyde and formaldehyde-releasing substances.

Item 2. The dipping composition according to item 1, wherein the at least one rubber latex is selected from the group consisting of natural rubber latex, styrene-butadiene rubber latex, ethylene-propylene-diene rubber latex, butyl rubber latex, styrene-butadiene-vinylpyridine rubber latex, nitrile butadiene rubber latex, chloroprene rubber latex, isoprene rubber latex, butadiene rubber latex, functionalized rubber latex and combinations thereof.

Item 3. The dipping composition according to item 1 or 2, wherein the at least one blocked isocyanate comprises units selected from the group consisting of tetramethylene diisocyanate, hexamethylene diisocyanate, diphenylmethane 4,4'-diisocyanate, octamethylene diisocyanate, decamethylene diisocyanate, dodecamethylene diisocyanate, aromatic diisocyanates comprising toluene 2,4- or 2,6-diisocyanate, tetramethylxylylene diisocyanate, p-xylene diisocyanate, 2,4'- or 4,4'-diisocyanatodiphenylmethane, phenyl 1,3- or 1,4-diisocyanate, and combinations thereof.

Item 4. The dipping composition according to anyone of items 1 to 3, wherein the at least one wax is selected from the group consisting of paraffin wax, microcrystalline wax, synthetic wax and combinations thereof.

Item 5. The dipping composition according to anyone of items 1 to 4, comprising
- 4.5% to 25% by weight (dry weight) of the at least one rubber latex,
- 0.2% to 4.5% by weight (dry weight) of the at least one blocked isocyanate,
- 0.3% to 5% by weight (dry weight) of the at least one wax,
- 0.2% to 4% by weight (dry weight) of the at least one epoxy group-containing compound selected from the group consisting of glycidyl-based glycerol, sorbitol-based epoxy compounds, phenol-based novolak epoxy compounds, cresol-based novolak epoxy compounds and combinations thereof, and
- 0.1% to 2% by weight (dry weight) of the at least one polymer with carboxylic acid functional groups based on monomers selected from acrylic acid, methacrylic acid, esters of acrylic acid, esters of methacrylic acid, itaconic acid, crotonic acid, cinnamic acid, maleic acid and combinations thereof,
- wherein the amounts in % by weight are based on the total weight of the aqueous dipping composition.

Item 6. The dipping composition according to anyone of items 1 to 4 which contains no epoxy group-containing compound.

Item 7. The dipping composition according to anyone of items 1 to 6, further comprising a base, preferably selected from the group consisting of ammonium hydroxide, sodium hydroxide and combinations thereof.

Item 8. The dipping composition according to anyone of items 1 to 7, further comprising a colorant and/or a filler selected from the group consisting of silica, silicate, carbon black, graphite, graphene, fullerenes, carbon nanotubes, alkaline earth carbonates, alkaline earth oxides, zinc oxide, titanium dioxide, aluminum oxide, alkaline earth hydroxides, aluminum hydroxide and combinations thereof.

Item 9. The dipping composition according to anyone of items 1 to 8, having a solid content of 6 to 30% by weight (dry weight), preferably 7 to 27% by weight.

Item 10. The dipping composition according to anyone of items 1 to 9, wherein the weight ratio of rubber latex to the sum of blocked isocyanate, epoxy-group containing compound and polymer with carboxylic acid functional groups is at least 3.

Item 11. Use of the aqueous dipping composition according to anyone of items 1 to 10 for coating a textile reinforcing material, preferably selected from the group consisting of polyesters, polyamides, polyurethanes, glass, carbon, celluloses, polycarbonates, polyketones and combinations thereof.

Item 12. A process for coating a textile reinforcing material, comprising the steps of
- treating a textile reinforcing material with the dipping composition according to anyone of items 1 to 11, preferably by dipping; and
- heat-treating the composition, preferably at a temperature in the range of from 60 to 260° C.

Item 13. A coated textile reinforcing material obtained from the process according to item 12.

Item 14. An elastomeric article comprising (i) at least one elastomeric compound and (ii) the coated textile reinforcing material according to item 13 or a textile reinforcing material that is coated with a heat-treated dipping composition according to anyone of items 1 to 10.

Item 15. The elastomeric article according to item 14 which is a tire or a rubber article, such as a belt, a conveyor belt, a transmission belt, a drive belt, a hose, a strip belt, a transport belt, and an air bellow.

The invention claimed is:

1. An aqueous dipping composition for coating a textile reinforcing material, comprising
   - 4% to 50% by dry weight of at least one rubber latex,
   - 0.1% to 10% by dry weight of at least one blocked isocyanate,
   - 0.3% to 15% by dry weight of at least one wax selected from the group consisting of microcrystalline wax, synthetic wax and combinations thereof,
   - 0% to 6% by dry weight of at least one epoxy group-containing compound, and
   - 0% to 15% by dry weight of at least one polymer with carboxylic acid functional groups,
   - wherein the amounts in % by dry weight are based on the total weight of the aqueous dipping composition,
   - wherein the weight ratio of rubber latex to the sum of blocked isocyanate, epoxy group-containing compound and polymer with carboxylic acid functional groups is at least 2, and
   - wherein a maximum amount of each of resorcinol, resorcinol precondensates, formaldehyde and formaldehyde releasers is 0.1% by weight.

2. The dipping composition according to claim 1, wherein the at least one rubber latex is selected from the group consisting of natural rubber latex, styrene-butadiene rubber latex, ethylene-propylene-diene rubber latex, butyl rubber latex, styrene-butadiene-vinylpyridine rubber latex, nitrile butadiene rubber latex, chloroprene rubber latex, isoprene rubber latex, butadiene rubber latex, functionalized rubber latex and combinations thereof.

3. The dipping composition according to claim 1, wherein the at least one blocked isocyanate comprises units selected from the group consisting of tetramethylene diisocyanate, hexamethylene diisocyanate, diphenylmethane 4,4'-diisocyanate, octamethylene diisocyanate, decamethylene diisocyanate, dodecamethylene diisocyanate, aromatic diisocyanates comprising toluene 2,4- or 2,6-diisocyanate, tetramethylxylylene diisocyanate, p-xylene diisocyanate, 2,4'- or 4,4'-diisocyanatodiphenylmethane, phenyl 1,3- or 1,4-diisocyanate, and combinations thereof.

4. The dipping composition according to claim 1, wherein the at least one wax comprises microcrystalline wax.

5. The dipping composition according to claim 1, comprising
   - 4.5% to 25% by dry weight of the at least one rubber latex,
   - 0.2% to 4.5% by dry weight of the at least one blocked isocyanate,
   - 0.3% to 5% by dry weight of the at least one wax selected from the group consisting of microcrystalline wax, synthetic wax and combinations thereof,
   - 0.2% to 4% by dry weight of the at least one epoxy group-containing compound selected from the group consisting of glycidyl-based glycerol, sorbitol-based epoxy compounds, phenol-based novolak epoxy compounds, cresol-based novolak epoxy compounds and combinations thereof, and 0.1% to 2% by dry weight of the at least one polymer with carboxylic acid functional groups based on monomers selected from acrylic acid, methacrylic acid, esters of acrylic acid, esters of methacrylic acid, itaconic acid, crotonic acid, cinnamic acid, maleic acid and combinations thereof, wherein the amounts in % by dry weight are based on the total weight of the aqueous dipping composition.

6. The dipping composition according to claim 1 which contains no epoxy group-containing compound.

7. The dipping composition according to claim 1, further comprising a base.

8. The dipping composition according to claim 1, further comprising a colorant, catalysts of isocyanate deblocking or trimerization reactions, catalysts of reactions between isocyanate and an epoxy group-containing and/or hydroxyl group-containing compound or a polymer with carboxylic acid functional groups, catalysts of reactions between a polymer with carboxylic acid functional groups and an epoxy group-containing and/or hydroxyl group-containing compound, and combinations thereof, and/or a filler selected from the group consisting of silica, silicate, carbon black, graphite, graphene, fullerenes, carbon nanotubes, alkaline earth carbonates, alkaline earth oxides, zinc oxide, titanium dioxide, aluminum oxide, alkaline earth hydroxides, aluminum hydroxide and combinations thereof.

9. The dipping composition according to claim 1, having a solid content of 6 to 30% by dry weight.

10. The dipping composition according to claim 1, wherein the weight ratio of rubber latex to the sum of blocked isocyanate, epoxy-group containing compound and polymer with carboxylic acid functional groups is at least 3.

11. A process for coating a textile reinforcing material, comprising the steps of
treating a textile reinforcing material with the dipping composition according to claim 1; and
heat-treating the composition.

12. A coated textile reinforcing material obtained from the process according to claim 11.

13. An elastomeric article comprising (i) at least one elastomeric compound and (ii) the coated textile reinforcing material according to claim 12.

14. The elastomeric article according to claim 13 which a rubber article.

15. The elastomeric article according to claim 14 in which the rubber article is selected from the group consisting of a tire, a belt, a conveyor belt, a transmission belt, a drive belt, a hose, a strip belt, a transport belt, and an air bellow.

16. An elastomeric article comprising (i) at least one elastomeric compound and (ii) a textile reinforcing material that is coated with a heat-treated dipping composition according to anyone of claim 1.

17. The elastomeric article according to claim 16 which comprises a rubber article.

18. The elastomeric article according to claim 17 in which the rubber article is selected from the group consisting of a tire, a belt, a conveyor belt, a transmission belt, a drive belt, a hose, a strip belt, a transport belt, and an air bellow.

19. The dipping composition according to claim 7, wherein the base is selected from the group consisting of ammonium hydroxide, sodium hydroxide and combinations thereof.

20. The dipping composition according to claim 9, having a solid content of 7 to 27% by dry weight.

21. The process according to claim 11, wherein the textile reinforcing material is treated by dipping and the composition is heat-treated at a temperature in the range of from 60 to 260° C.

22. The dipping composition according to claim 1, comprising
4.5% to 25% by dry weight of the at least one rubber latex,
0.2% to 4.5% by dry weight of the at least one blocked isocyanate, and
0.3% to 5% by dry weight of the at least one wax.

* * * * *